United States Patent [19]

Sander

[11] 3,930,064
[45] Dec. 30, 1975

[54] METHOD FOR CURING A COATING ON A BASE

[76] Inventor: Conrad Sander, Panoramastrasse 55, 7441 Zizishausen, Germany

[22] Filed: Nov. 5, 1974

[21] Appl. No.: 455,946

Related U.S. Application Data

[63] Continuation-in-part of Ser. No. 407,652, Oct. 18, 1973, abandoned, which is a continuation of Ser. No. 135,009, April 19, 1971, abandoned.

[30] Foreign Application Priority Data

Apr. 22, 1970 Germany............................ 2019270

[52] U.S. Cl.............. 427/54; 204/159.22; 427/385
[51] Int. Cl.²............................................. B05D 3/06
[58] Field of Search............. 117/93.31; 204/159.22; 427/54, 385

[56] References Cited
UNITED STATES PATENTS

| | | | |
|---|---|---|---|
| 2,453,769 | 11/1948 | Wendt | 117/93.31 |
| 2,453,770 | 11/1948 | Wendt | 117/93.31 |
| 3,008,242 | 11/1961 | Sites et al. | 117/93.31 |
| 3,047,422 | 7/1962 | Sites et al. | 117/93.31 |
| 3,656,999 | 4/1972 | Lundsager | 117/93.31 |
| 3,669,716 | 6/1972 | Keyl et al. | 117/93.31 |

*Primary Examiner*—J. H. Newsome
*Attorney, Agent, or Firm*—Roylance, Abrams, Berdo & Kaul

[57] ABSTRACT

The curing and hardening of a coating which is applied in a liquid condition upon a base and consists of an organic material which reacts exothermically when energized by being exposed to one or more flashes of ultraviolet rays of a flash lamp which directly initiate the reaction in the coating material without requiring photosensitizers to be added to this material.

5 Claims, 4 Drawing Figures

METHOD FOR CURING A COATING ON A BASE

This application is a continuation-in-part of application Ser. No. 407,652, filed Oct. 18, 1973, which, in turn was a Rule 60 continuation of application Ser. No. 135,009, filed Apr. 19, 1971, both now abandoned.

The present invention relates to a method and apparatus for curing and hardening a coating which is applied upon a base or other support and consists of an organic material which when energized by being exposed to at least one flash of ultraviolet rays reacts exothermically. When speaking herein of a material which reacts exothermically, a material is meant which gives off energy during its reaction, for example, a varnish which dries by oxidation and may especially be either a synthetic resin varnish or an oil varnish.

In one prior method for curing a film consisting of an unsaturated polyester, a photosensitizer is added to this material. By being exposed to flashes of ultraviolet light of at least 50 watt seconds per flash and at photochemically active-wave lengths, these photosensitizers release radicals which initiate the reaction in the polyester film. Since the quantity of photosensitizers which is added to the polyester amounts to 0.5% of the latter, a reaction will occur at first only in up to 5% of the outer surface area of the polyester film. It is therefore necessary to carry out a very large number of flashes in order to attain the desired final cure of the film. In order to reduce the length of time which is required for the entire curing process, a plurality of flash tubes are provided which produce flashes successively. The amount of ultraviolet light which is required for fully curing the polyester film may be reduced if the base to be coated with this film is first primed with a ground coating upon which the polyester film is then applied, whereupon this primed and coated base is then subjected to a heat treatment before it is exposed to the ultraviolet rays.

It has now been discovered that a coating containing ethylenic unsaturation, i.e., double bonds between carbon atoms such as are contained in a varnish which dries by oxidation, may be cured most effectively without the use of added photosensitizers by exposing the coating to at least one flash of ultraviolet light to initiate reaction in the coating. The energy of the flash of light should produce at least 4.5 milliwatt-seconds per $cm^2$ of the surface of the coating. Such a flash produces at least about 0.03% of radiation having an effective wave length of 197.4 nm. It is also advantageous that the flash produce at least about 0.004% of radiation having an effective wave length of 184.9 nm and at least about 0.001% of radiation having an effective wave length of 389.0 nm. It must be noted that these values relate to the radiation produced and not to the energy used in a lamp to create the radiation. These results are not obtained by conventional ultraviolet lamps. Thus, mercury vapor lamps do not produce enough rays below wave length 200 nm to be effective without burning the coating and ultraviolet radiators which give off radiation having a high proportion of radiation below 200 nm, such as deuterium radiators, are unsatisfactory since the radiation does not exceed a certain power threshold required to initiate the reaction. However, the use of an apparatus hereinafter described produces a flash of sufficient energy, i.e., at least 4.5 milliwatt-seconds per $cm^2$ of the surface of the coating being irradiated, to have the desired high portion of wave length of 197.4 nm. It has not previously been known that 197.4 nm is the effective wave length for coatings containing ethylenic unsaturation.

It is an object of the present invention to cure and harden a coating of an organic, exothermically reacting material by means of a relatively low amount of light energy and without requiring a photosensitizer or photoinitiator to be added to this material. For attaining this object, the invention provides that for curing this material to which no photosensitizers need to be added it is exposed to at least one flash of ultraviolet light which directly initiates the reaction of the material. If a flash of ultraviolet light acts directly upon the material, the reaction of the coating which is exposed to this light will start along its entire surface and will penetrate from the latter to the inside of the coating like a chain reaction, whereby the organic, exothermically reacting material will be cured and hardened within a very short time. Thus, for example, a single short flash of ultraviolet rays must suffice for curing and hardening such an organic, exothermically reacting material.

Another feature of the present invention consists in employing a flash of ultraviolet light of a wave range at least a part of which has a wave length which is effective for curing the coating material and lies within the resonant range of the radical of the material. This effective wave length does not have to amount to a large component of the entire wave range of the rays of each flash but only a small component of this range will suffice which lies within the resonant range of the radical of the material to be cured. However, the larger this component is made, the shorter will be the length of time which is required for fully curing and hardening the material.

For curing and hardening a coating of an organic material which is applied upon a base and after being energized by being exposed to ultraviolet rays reacts exothermically, the invention further provides an apparatus which comprises a flash lamp for emitting ultraviolet rays which is connected to an ignition unit. It is an essential feature of this apparatus that the mentioned flash lamp is adapted to produce and emit flashes of ultraviolet rays which act directly upon the organic material for fully curing and hardening the same without requiring any addition of photosensitizers to this material, and which flashes have a wave length which preferably lies within the resonant range of the radical of the material to be cured.

This feature as well as additional features and advantages of the present invention will become further apparent from the following detailed description thereof which is to be read with reference to the accompanying drawings, in which FIG. 1 shows a diagrammatic cross section of an apparatus according to the invention;

FIG. 3 shows a diagrammatic graphic illustration of flash impulses of the flash lamp of the apparatus according to the invention; while

Figure 1:
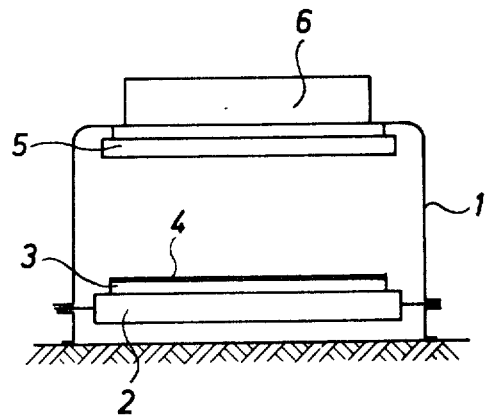

The apparatus according to the invention as illustrated in FIG. 1 comprises a housing 1 which is closed toward the outside and contains a conveying mechanism 2, for example, in the form of rollers which are driven from the outside and are adapted to convey, for example, relatively thin flat elements 3 which are provided with a coating 4 consisting of a synthetic resin varnish or oil varnish which is capable of drying by oxidation. On the upper wall of housing 1 a flash tube 5 is mounted which is connected to an ignition unit 6 and produces flashes of ultraviolet rays having the previously described wave length.

Figure 2:
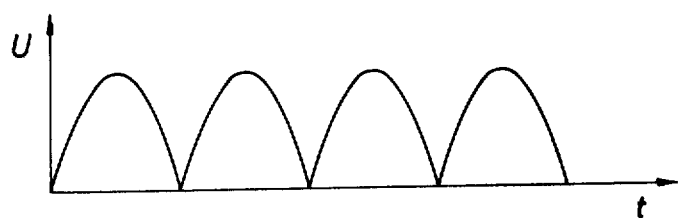
FIG. 2 shows a graphic illustration of flash impulses which are produced by an ultraviolet lamp which is connected to a source of alternating current.
Figure 3:
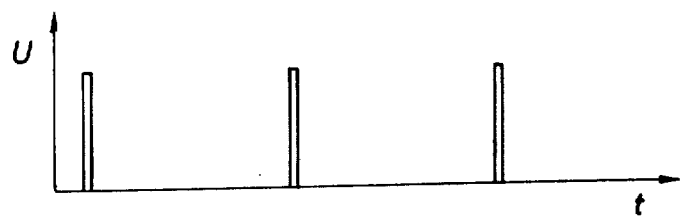

If the flash tube 5 would be connected to a conventional source of alternating current, it would emit flash impulses of the kind as illustrated in FIG. 2. However, by being connected to the ignition unit 6, tube 5 will produce flash impulses of a shape as illustrated in FIG. 3 or of another shape similar thereto. Depending upon the kind of flash tube employed, it may be necessary to supply it with a base voltage of a certain minimum strength. Such a base voltage is not required if the flash tube consists, for example of a xenon-filled tube which is provided with an additional ignition winding and the sealed bulb of which preferably consists of synthetic or chemically pure natural quartz or the like which is highly permeable for the desired wave length. If, however, a mercury-vapor lamp is employed, it has to be supplied with a base voltage for preventing it from being extinguished after each flash.

Figure 4:
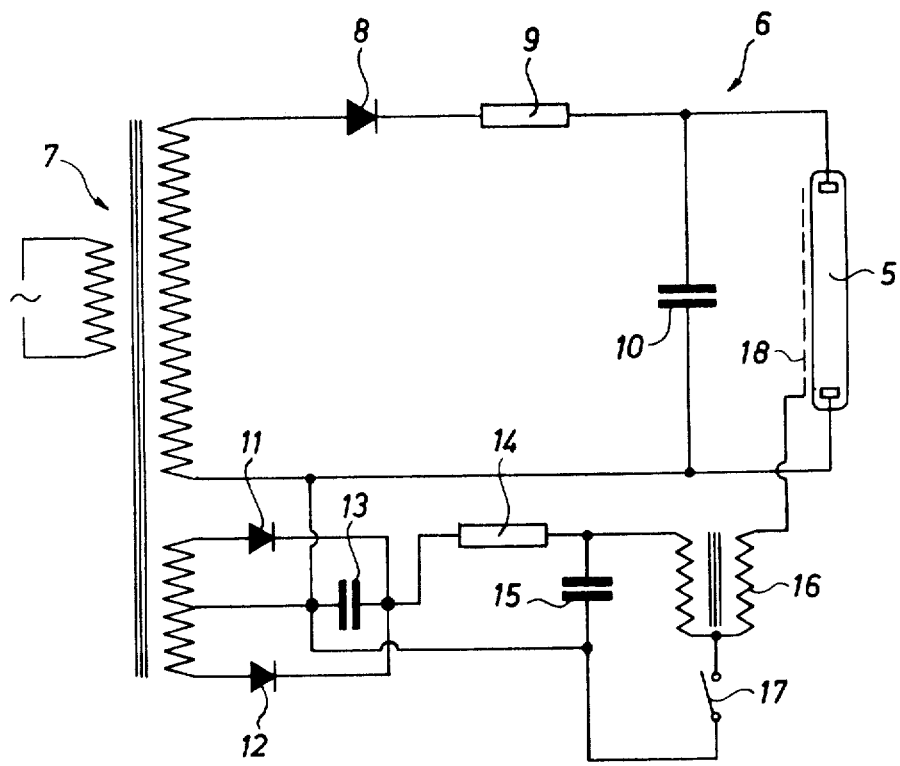
FIG. 4 shows a circuit diagram of an ignition unit of this apparatus.

As illustrated in FIG. 4, the ignition unit 6 for tube 5 is provided with a transformer 7 which is to be connected to a source of alternating current and the secondary side of which is connected via a one-way rectifier 8 and a resistor 9 to the electrodes of tube 5 which is also connected in parallel to a condenser 10. An ignition circuit which is likewise connected to the secondary side of the transformer 7 comprises a two-way rectifier 11, 12 in a bridge circuit which contains a smoothing condenser 13 one side of which is connected to one of the electrodes of tube 5, while its other side together with the rectifier 11, 12 is connected via a resistor 14 to a high-tension or ignition transformer 16 to which an ignition condenser 15 and a switch 17 are connected in parallel. This switch 17 may be a pulse switch, a thyristor or the like. The ignition transformer 16 is connected to an ignition winding 18 of tube 5. The ignition unit 6 is adapted to produce short flashes as illustrated in FIG. 3, each of which lasts for about one-thousandth of a second and which are separated from each other by long intervals. The longer the intervals are made between the individual flash impulses which may also be of a shape different from that as shown in FIG. 3, the smaller will be the amount of energy which is required for curing and hardening the coating material.

Typically, from a long to a short duration of flash, the value of the resistance on resistor 9 amounts to 0.2 to 0.02 ohm; of the capacitor 10, from 100 to 5 microfarads at a voltage of from 3.2 to 6 kilovolts.

Of the electric energy fed to the flash tube, about 38.9% is converted into radiation.

As previously described, the apparatus according to the invention is to be used for curing and hardening a coating which is applied upon a base or support and consists of an organic material which when energized by being exposed to radiation reacts exothermically and continues to react when the flash is completed. This material especially comprises a varnish which dries by oxidation. This may be, for example, a synthetic resin varnish or an oil varnish. These kinds of varnishes are relatively inexpensive and are therefore more frequently employed in industry than other varnishes.

When a flash of light from tube 5 hits upon the surface of the coating, it starts a reaction in the latter and continues in the form of a chain reaction into the inside of the coating. This reaction is very intensive since a large number of molecules of the surface layer participate therein. Under favorable conditions a single flash may suffice for curing and hardening the coating, while in other cases several flashes will be required.

When the varnishes employed are being cured, an energy-producing or exothermic reaction occurs therein which is caused or initiated by at least one flash containing the specified wave length. As already stated, the varnishes continue to react to a certain extent when the respective flash is completed. When this organic material is exposed to a flash, the radical of this material is energized at a frequency which corresponds to its resonant frequency, and this radical participates in the curing process of the material, for example, a varnish drying by oxidation, whereby oxygen is activated. The rays must have a frequency which corresponds to the resonant frequency of the molecules of the coating which combine with oxygen. In all varnishes to which the method according to the invention applies, this frequency corresponds to a wave length of 197.4 nm. The curing process may be further accelerated if a small component of the rays has a wave length which corresponds to one of the resonance lines of the oxygen, i.e., to 184.9 nm. It has also been found that the curing process may be accelerated if a component of the rays has a wave length of 389.0 nm.

The number of flash impulses which are to be produced within a certain time unit may differ in accordance with the particular kind of varnish employed, and while in one case a single flash impulse may suffice, it may be necessary in other cases to apply 10 to 20 flash impulses per second. The number of flash impulses which have to impinge upon the coating for curing and hardening the same depends upon the type of material and the thickness of the casing of the flash tube and upon the component of effective rays of all of the rays emanating from the tube, and also upon the thickness of the coating, the permeability of the coating to the penetration of the rays applied and upon similar factors.

The energy-producing or exothermic reaction of the coating materials employed must be initiated by flash impulses of a certain frequency and must continue at least for a certain length of time after each flash is terminated. For reducing the length of the period required for the curing process the varnishes to be dried may be mixed with quickly evaporating solvents of a low boiling point, for example, with ethyl acetate butanol, acetone or the like. For the same purpose, it is also possible to add photosensitizers or photoinitiators or other light-reactive materials to the coating material, for example, ammonium bichromate, chromic acid or the like. These substances are, however, not necessary for the curing process of the coating itself, although an addition of chromic acid or of ammonium bichromate from which chromic acid is formed at the moment of a flash has an additional curing and hardening effect.

The energy of the rays which is required for the curing process is the lower the longer the interval between the flash impulses is made as compared with the length of time of one flash. Thus, referring to FIG. 3, if the duration of the flash is designated as $t_1$ and the length of the time between the flashes is designated as $t_2$, then the ratio of $t_2$ to $t_1$ is preferably greater than 100 to 1.

The time between the flashes ($t_2$) is determined by the duration of the course of the reaction stimulated by the preceding flash. This time is preferably not less than 0.1 second. The frequency, expressed in cycles per second, is preferably greater than 10. The selected frequency depends upon the useful life of the photoflash lamp. The higher the frequency, the lower will be the duration of the individual flash.

The short-wave component in which the wave length of 197.4 nm occurs in an ultraviolet lamp may be increased by employing a current of a density of more than 4000 A/cm$^2$ of the cross section of the light arc which is produced between the electrodes of the lamp 5 in FIG. 4 for producing one flash at an output of less than 100 watt seconds and by making the length of the flash smaller than 50 microseconds. The higher the current density is made, the larger will be the short-wave component containing the wave length of 197.4 nm and the current density may be made much higher than the value as previously stated and may amount to about 30 000 A/cm$^2$ of the cross section of the light arc which is produced between the electrodes of the lamp 5 in FIG. 4.

The brief flash time is important in order to achieve the necessary current density in the instant of the flash. Such a small strength of irradiation results in a relatively small amount of energy needed for this purpose. Whenever during a prolonged time the flash has an output of more than 100 watt seconds, then the necessary current density for the production of the desired short wave length is not achieved.

The ratio of the energy produced directly by the lamp to the energy that is applied to the surface being irradiated depends on the distance between the surface and the lamp, whether a reflector is used, etc. In other words, the preferred current density of 4,000 ampere per cm$^2$ of the cross section of the light arc does not necessarily result in the production of at least 4.5 milliwatt-seconds per cm$^2$ of the surface of the irradiated coating but it does result in the flash having the desired portion of wave length of 197.4 nm.

If the flashes only last for a short time, the electrodes of the flash tube will not be highly heated and it will therefore be necessary to cool them very little, it at all. A favorable length of the flashes lies within the range of 20 to 30 milliseconds. If each flash has a shorter length, the frequency of the flashes may be made much higher than that which is possible if the flashes last for longer periods, and they may amount, for example, to 100 flashes per second and more. At a higher frequency, the number of flashes within a certain time unit and thus also the effective wave-length component of the entire wave range will be higher than at a lower frequency. This component may therefore be considerably increased when the frequency of the flashes is increased. At short flashes, the amount of energy emitted from each flash and received by the coating will also be low.

The required power output of each flash amounts to less than 100 watt seconds and in actual practice it generally amounts to a much lower value and lies, for example, within an order of about 20 watt seconds.

For drying a coating material which consists of a synthetic-resin varnish or oil varnish and dries by oxidation, a xenon flash tube is preferably employed. The frequency of the flashes of such a tube amounts to 10 cycles per second and the flash output to slightly less than 100 watt seconds at an anode voltage of 4 KV. The following examples were carried out with such a flash tube for curing and hardening particular coating materials in accordance with the invention.

1. A varnish consisting of 35% of styrolized alkyd, 50% titanium dioxide and 15% of a solvent, for example, high-grade gasoline, and with the thickness of the coating amounting to 30 micrometers was fully cured and hardened after being exposed to 400 flashes.

2. A mixture of 60% of aluminum-reinforced soy oil, 30% of iron oxide red, and 10% of xylol with a thickness of the coating of 30 micrometers was fully cured and hardened after being exposed to 300 flashes.

3. A colorless varnish consisting of 68% of vegetable fatty acids and 32% of a solvent, for example, high-grade gasoline, and with a thickness of the coating of 25 micrometers was fully cured and hardened after being exposed to 600 flashes.

4. A printing ink of a commercial type which consisted of a material which dries by oxidation and contained no addition of siccatives and had a layer thickness of about 3 micrometers was applied by a printing press upon paper. The ink was completely dried and cured after being exposed to 10 flashes.

Although my invention has been illustrated and described with reference to the preferred embodiments thereof, I wish to have it understood that it is in no way limited to the details of such embodiments but is capable of numerous modifications within the scope of the appended claims.

What is claimed is:

1. A method of curing and hardening a coating on a base, said coating comprising an organic material which reacts exothermically with oxygen after being energized by being exposed to ultraviolet light, containing an ethylenically unsaturated double bond, which method comprises exposing said coating to a plurality of flashes of ultraviolet light to initiate a reaction in said coating, each said flash producing energy of at least 4.5 milliwatt/seconds per cm$^2$ of the surface of said coating to produce at least about 0.03% of radiation having an effective wave length of 197.4 nm, the means employed for producing said flashes being a flash lamp supplied with a current per flash having a density of more than 4000 A/cm$^2$ of the cross section of the light arc which is produced between the electrodes in said flash lamp and an output of less than 100 watt/seconds, said flash lasting for a period of less than 50 microseconds, each of said flashes being separated from the next flash for a period of time having a length equal to more than 100 times the length of time of one of said flashes.

2. A method as defined in claim 1 wherein said organic material is a varnish.

3. A method as defined in claim 1 wherein said flash also produces at least about 0.004% of radiation having an effective wave length of 184.9 nm.

4. A method as defined in claim 3 wherein said flash also produces at least about 0.001% of radiation having an effective wave length of 389.0 nm.

5. A method as defined in claim 1 wherein said coating is free of added photosensitizers.

* * * * *